US009852685B2

(12) United States Patent
Duan et al.

(10) Patent No.: US 9,852,685 B2
(45) Date of Patent: Dec. 26, 2017

(54) PIXEL CIRCUIT AND DRIVING METHOD THEREOF, DISPLAY APPARATUS

(71) Applicant: BOE TECHNOLOGY GROUP CO., LTD., Beijing (CN)

(72) Inventors: Liye Duan, Beijing (CN); Zhongyuan Wu, Beijing (CN); Lirong Wang, Beijing (CN); Kun Cao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 56 days.

(21) Appl. No.: 14/646,179

(22) PCT Filed: Sep. 26, 2014

(86) PCT No.: PCT/CN2014/087579

§ 371 (c)(1),
(2) Date: May 20, 2015

(87) PCT Pub. No.: WO2015/149490

PCT Pub. Date: Oct. 8, 2015

(65) Prior Publication Data

US 2016/0180770 A1 Jun. 23, 2016

(30) Foreign Application Priority Data

Mar. 31, 2014 (CN) .......................... 2014 1 0126737

(51) Int. Cl.
*G09G 3/30* (2006.01)
*G06F 3/038* (2013.01)
(Continued)

(52) U.S. Cl.
CPC ......... *G09G 3/3233* (2013.01); *G09G 3/3291* (2013.01); *G09G 2300/0426* (2013.01);
(Continued)

(58) Field of Classification Search
CPC ............... G09G 3/3233; G09G 3/3291; G09G 2300/0819; G09G 2310/0289;
(Continued)

(56) References Cited

U.S. PATENT DOCUMENTS 6,611,107 B2 8/2003 Mikami et al.
7,612,749 B2 11/2009 Libsch et al.
(Continued)

FOREIGN PATENT DOCUMENTS

CN 1427388 A 7/2003
CN 101136173 A 3/2008
(Continued)

OTHER PUBLICATIONS

Second Chinese Office Action of Chinese Application No. 201410126737.8 in Chinese, mailed Mar. 10, 2016 with English translation.
(Continued)

*Primary Examiner* — Kumar Patel
*Assistant Examiner* — Kuo Woo
(74) *Attorney, Agent, or Firm* — Collard & Roe, P.C.

(57) ABSTRACT

There are provided a pixel circuit and a driving method thereof, and a display apparatus. The pixel circuit comprises: a first transistor (T1), a second transistor (T2), a third transistor (T3), a storage capacitor (C1) and a light emitting device (L). A gate of the first transistor (T1) is connected to a first control signal terminal (S1), and a first electrode thereof is connected to a data signal terminal (DATA); a gate of the second transistor (T2) is connected to a second electrode of the first transistor (T1), a first electrode thereof is connected to a second electrode of the third transistor (T3), and a second electrode thereof is connected to a first terminal of the light emitting device (L); a gate of the third transistor (3) is connected to a second control signal terminal
(Continued)

(S2), and a first electrode thereof is connected to a first power supply signal terminal (ELVDD); one terminal of the storage capacitor (C1) is connected to the gate of the second transistor (T2), and the other terminal thereof is connected to the second electrode of the second transistor (T2); one terminal of a parasitic capacitor (C2) formed by the light emitting device is connected to the first terminal of the light emitting device (L), and the other terminal thereof is connected to a second terminal of the light emitting device (L); and the second terminal of the light emitting device (L) is further connected to a second power supply signal terminal (ELVSS). The pixel circuit can compensate for the threshold voltage drift of TFT effectively and rise display effect.

13 Claims, 5 Drawing Sheets

(51) Int. Cl.
*G09G 3/3233* (2016.01)
*G09G 3/3291* (2016.01)

(52) U.S. Cl.
CPC ............... *G09G 2300/0819* (2013.01); *G09G 2300/0842* (2013.01); *G09G 2300/0861* (2013.01); *G09G 2310/0289* (2013.01); *G09G 2320/0233* (2013.01); *G09G 2320/0626* (2013.01); *G09G 2330/021* (2013.01)

(58) Field of Classification Search
CPC ... G09G 2320/0233; G09G 2320/0626; G09G 2330/021
USPC .................................................... 345/76, 204
See application file for complete search history.

(56) References Cited

U.S. PATENT DOCUMENTS

| | | | | |
|---|---|---|---|---|
| 7,920,120 | B2 | 4/2011 | Minami et al. | |
| 8,654,111 | B2 | 2/2014 | Uchino et al. | |
| 8,823,604 | B2 | 9/2014 | Yamashita et al. | |
| 2008/0048949 | A1 | 2/2008 | Kim | |
| 2009/0231241 | A1 * | 9/2009 | Abe | G09G 3/2011 345/76 |
| 2010/0045637 | A1 * | 2/2010 | Yamashita | G09G 3/3233 345/204 |
| 2010/0220091 | A1 | 9/2010 | Choi | |

FOREIGN PATENT DOCUMENTS

| | | | |
|---|---|---|---|
| CN | 101136180 | A | 3/2008 |
| CN | 101231819 | A | 7/2008 |
| CN | 101310318 | A | 11/2008 |
| CN | 101436381 | A | 5/2009 |
| CN | 101986378 | A | 3/2011 |
| CN | 103680406 | A | 3/2014 |
| CN | 103943067 | A | 7/2014 |
| CN | 203760050 | U | 8/2014 |

OTHER PUBLICATIONS

International Search Report of PCT/CN2014/087579 in Chinese with English translation, mailed Jan. 28, 2015.
Notice of Transmittal of the International Search Report PCT/CN2014/087579 in Chinese, mailed Jan. 6, 2015.
Written Opinion of the International Searching Authority of PCT/CN2014/087579 in Chinese with English translation, mailed Jan. 6, 2015.
Chinese Office Action of Chinese Application No. 201410126737.8 in Chinese with English translation, mailed Aug. 4, 2015.
Third Chinese Office Action of Chinese Application No. 201410126737.8 in Chinese, mailed Sep. 7, 2016 with English translation.

* cited by examiner

PIXEL CIRCUIT AND DRIVING METHOD THEREOF, DISPLAY APPARATUS

CROSS REFERENCE TO RELATED APPLICATIONS

This application is the National Stage of PCT/CN2014/087579 filed on Sep. 26, 2014, which claims priority under 35 U.S.C. §119 of Chinese Application No. 201410126737.8 filed on Mar. 31, 2014, the disclosure of which is incorporated by reference.

TECHNICAL FIELD

The present disclosure relates to a pixel circuit and a driving method of the same, and a display apparatus.

BACKGROUND

At present, an active matrix organic light emitting diode (AMOLED) panel uses a thin film transistor (TFT) to drive an organic light emitting diode (OLED) to emit light.

An AMOLED pixel circuit adopts generally a 2T1C circuit comprising two TFTs and one capacitor. In this 2T1C circuit, the current $I_{OLED}$ flowing through OLED is calculated by the equation of:

$$I_{OLED} = \frac{1}{2}\mu_n \cdot Cox \cdot \frac{W}{L} \cdot (Vdata - Voled - Vthn)^2$$

where $\mu_n$, is a carrier mobility, $C_{ox}$ is a gate oxide layer capacitor, W/L is a width to length ratio of the transistor, Vdata is a data voltage, Voted is an operating voltage of OLED shared by all the pixel units, and Vthn is a threshold voltage of the transistor. Vthn is a positive value for an enhancement type TFT, while Vthn is a negative value for a depletion type TFT.

However, due to limitation of crystallization process and manufacturing level, non-uniformity always occurs in electrical parameters such as threshold voltage, mobility and so on of the TFT switching circuit manufactured on a large-area glass substrate, such that threshold voltage offset of respective TFTs is inconsistent. It can be known from the above equation that currents flowing through different OLEDs have a difference if Vthn among different pixel units is different. If Vthn of pixels drifts with the time, this may result in that currents flowing through successively the same OLED are different, thereby causing image sticking. Furthermore, because non-uniformity of the OLED devices causes the operating voltages of OLED to be different, it may also result in current difference, thereby causing difference in display brightness of AMOLED.

SUMMARY

Embodiments of the present disclosure provide a pixel circuit and a driving method of the same, and a display apparatus, which can compensate for the threshold voltage drift of TFT effectively, raise uniformity of light emitting brightness of the display apparatus, and enhance display effect.

According to one aspect of an embodiment of the present disclosure, there is provided a pixel circuit, comprising: a first transistor, a second transistor, a third transistor, a storage capacitor and a light emitting device, wherein a gate of the first transistor is connected to a first control signal terminal, and a first electrode thereof is connected to a data signal terminal; a gate of the second transistor is connected to a second electrode of the first transistor, a first electrode thereof is connected to a second electrode of the third transistor, and a second electrode thereof is connected to a first terminal of the light emitting device; a gate of the third transistor is connected to a second control signal terminal, and a first electrode thereof is connected to a first power supply signal terminal; one terminal of the storage capacitor is connected to the gate of the second transistor, and the other terminal thereof is connected to the second electrode of the second transistor; one terminal of a parasitic capacitor formed by the light emitting device is connected to the first terminal of the light emitting device, and the other terminal thereof is connected to a second terminal of the light emitting device; and the second terminal of the light emitting device is further connected to a second power supply signal terminal.

According to another aspect of an embodiment of the present disclosure, there is further provided a display apparatus comprising the pixel circuit as described above.

According to another aspect of an embodiment of the present disclosure, there is further provided a pixel circuit driving method for driving the pixel circuit as described above, comprising:

in a first phase, turning on the first transistor and the third transistor; inputting a first voltage by the first power supply signal terminal, inputting a reset signal by a data signal terminal, turning on the second transistor, and controlling the light emitting device to be in a turn-off state, such that a voltage of the storage capacitor is greater than a threshold voltage of the second transistor;

in a second phase, maintaining the first transistor and the third transistor turning on; inputting a second voltage by the first power supply signal terminal, so that the second transistor is turned off, the voltage of the storage capacitor is equal to the threshold voltage of the second transistor, and the light emitting device is in a turn-off state;

in a third phase, maintaining the first transistor turning on; turning off the third transistor, inputting a data signal by the data signal terminal, so that the second transistor is turned on, and data is written into the first terminal of the light emitting device through a voltage dividing effect of the storage capacitor and a parasitic capacitor formed by the light emitting device; and in a fourth phase, turning off the first transistor, turning on the third transistor, and driving the light emitting device to emit light by a current flowing through the second transistor and the third transistor.

The pixel circuit, its driving method and the display apparatus according to the embodiments of the present disclosure control turning off/on and charging/discharging of the circuit through a plurality of transistors and capacitors, so that the current flowing through the transistors and being used to drive the light emitting device is unrelated to the threshold voltage of the transistors, which compensates for the difference in current flowing through the light emitting device due to inconsistency or offset of the threshold voltage of the transistors, raises uniformity of light emitting brightness of the display apparatus, and greatly enhances display effect. In addition, this pixel circuit has a simple structure and a smaller number of transistors, so as to be able to reduce the size of shading area covering the transistors and increase the aperture ratio of the display apparatus effectively.

DETAILED DESCRIPTION

Technical solution in embodiments of the present disclosure will be described clearly and completely by combining with the accompanying figures.

Figure 1:
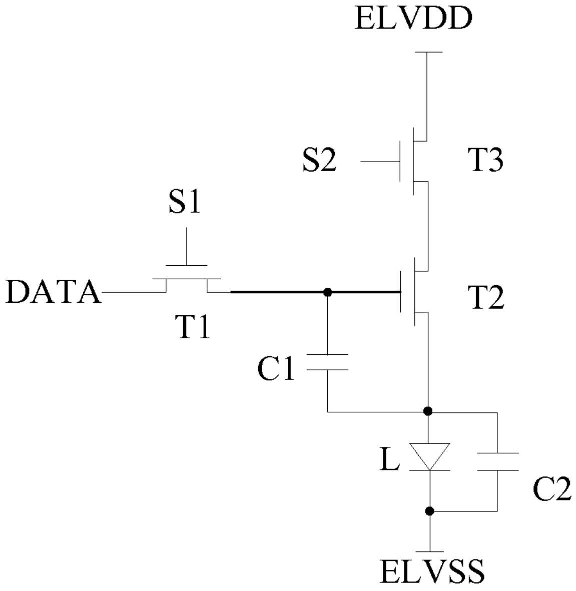
FIG. 1 is a schematic diagram of a connecting structure of a pixel circuit provided in an embodiment of the present disclosure.

FIG. 1 shows schematically a connecting structure of a pixel circuit of an embodiment of the present disclosure. As shown in FIG. 1, the pixel circuit comprises: a first transistor T1, a second transistor T2, a third transistor T3, a storage capacitor C1 and a light emitting device L.

A gate of the first transistor T1 is connected to a first control signal terminal S1, and a first electrode thereof is connected to a data signal terminal DATA.

A gate of the second transistor T2 is connected to a second electrode of the first transistor T1, a first electrode thereof is connected to a second electrode of the third transistor T3, and a second electrode thereof is connected to a first terminal of the light emitting device L.

A gate of the third transistor T3 is connected to a second control signal terminal S2, and a first electrode thereof is connected to a first power supply signal terminal ELVDD.

One terminal of the storage capacitor C1 is connected to the gate of the second transistor T2, and the other terminal thereof is connected to a second electrode of the second transistor T2.

One terminal of a parasitic capacitor C2 formed by the light emitting device L is connected to a first terminal of the light emitting device L, and the other terminal thereof is connected to a second terminal of the light emitting device L.

The second terminal of the light emitting device L is further connected to a second power supply signal terminal ELVSS.

It needs to note that the light emitting device L in the embodiment of the present disclosure may be various current-driven light emitting devices including a light emitting diode (LED) or an organic light emitting diode (OLED). The embodiments of the present disclosure are described by taking OLED as an example.

The pixel circuit provided in the embodiment of the present disclosure controls turning off/on and charging/discharging of the circuit through a plurality of transistors and capacitors, so that the current flowing through the transistors and being used to drive the light emitting device is unrelated to the threshold voltage of the transistors, which compensates for the difference in current flowing through the light emitting device due to inconsistency or offset of the threshold voltage of the transistors, raises uniformity of light emitting brightness of the display apparatus, and greatly enhances display effect. In addition, since this pixel circuit has a simple structure and a smaller number of transistors, the size of shading area covering the transistors can be reduce and the aperture ratio of the display apparatus are increased effectively.

As an example, the first transistor T1, the second transistor T2 and the third transistor T3 are N type transistors. First electrodes of the first transistor T1, the second transistor T2 and the third transistor T3 are drains, and second electrodes thereof are sources. The first terminal of the light emitting device is an anode, and the second terminal thereof is a cathode.

It needs to note that the manufacturing technique of adopting N type transistors to integrate a driving circuit has been already mature currently. Therefore, the first transistor T1, the second transistor T2 and the third transistor T3 in the embodiments of the present disclosure are N type transistors, which can reduce manufacturing cost and realize simple technique.

Figure 2:
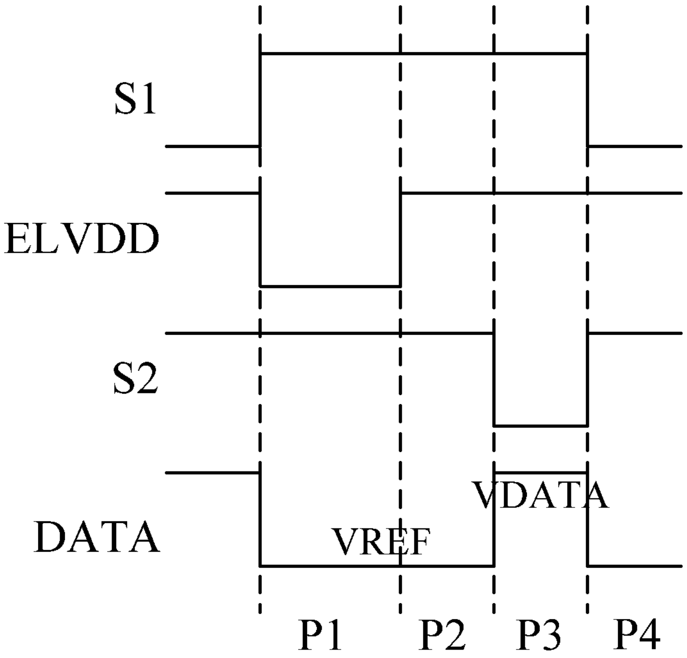
FIG. 2 is a timing diagram of respective signal lines driving the pixel circuit as shown in FIG. 1.

In the operation of the pixel circuit as shown in FIG. 1, its operating process can be divided into four phases, i.e., a resetting phase, a compensating phase, a data writing phase, and a light emitting phase respectively. FIG. 2 is a timing diagram of respective signal lines in the operating process of the pixel circuit as shown in FIG. 1. As shown in FIG. 2, P1, P2, P3 and P4 are used to represent the resetting phase, the compensating phase, the data writing phase and the light emitting phase in FIG. 2 respectively.

Figure 3:
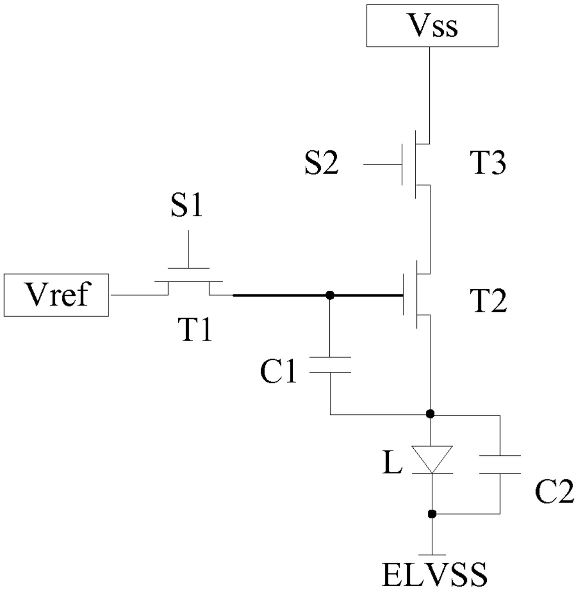
FIG. 3 is a schematic diagram of an equivalent circuit of a pixel circuit provided in an embodiment of the present disclosure in a resetting phase.

As an example, the phase P1 is the resetting phase. The equivalent circuit in this phase is as shown in FIG. 3. In the resetting phase, the first control signal terminal S1 and the second control signal terminal S2 are input a high level, a first power supply signal terminal ELVDD is input a low level (Voled), and the data signal terminal DATA is input a reset signal (Vref) at the low level, wherein $Vref-Voled>Vth$ (Vth is the threshold voltage of the second transistor T2). Now, the first transistor T1, the second transistor T2 and the third transistor T3 are turned on, the voltage across the storage capacitor C1 is $Vref-Voled$, the anode voltage of the light emitting device L is Voled, and the light emitting device L is in a turn-off state.

Figure 4:
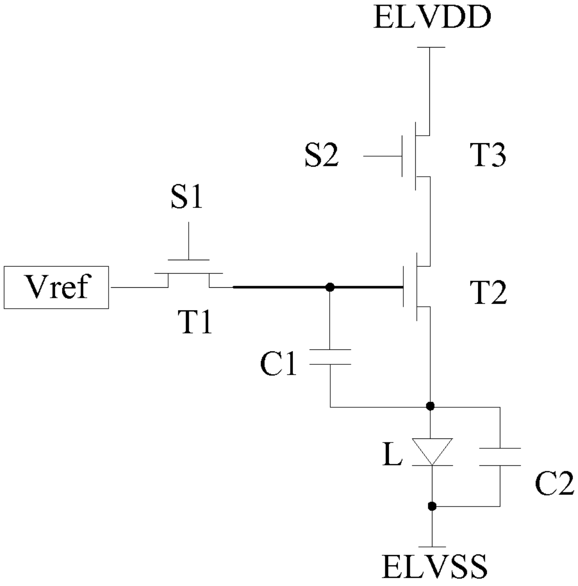
FIG. 4 is a schematic diagram of an equivalent circuit of a pixel circuit provided in an embodiment of the present disclosure in a compensating phase.

The phase P2 is the compensating phase. The equivalent circuit in this phase is as shown in FIG. 4. In the compensating phase, the first control signal terminal S1, the second control signal terminal S2 and the first power supply signal terminal ELVDD are input the high level, and the data signal terminal DATA is input the reset signal (Vref) at the low level. Now, the first transistor T1, the second transistor T2 and the third transistor T3 are maintained to be turned on, and the anode voltage of the light emitting device L rises as the second transistor T2 is charged, until the voltage is equal to $Vref-Vth$. When the compensating phase ends up, the charge stored at the two terminals of the storage capacitor C1 is $Vth \cdot C_{ST}$, where $C_{ST}$ is capacitance of the storage capacitor C1. At this time, the second transistor is turned off, and the voltage at the two terminals of the storage capacitor C1 is the threshold voltage Vth of the second transistor.

Figure 5:
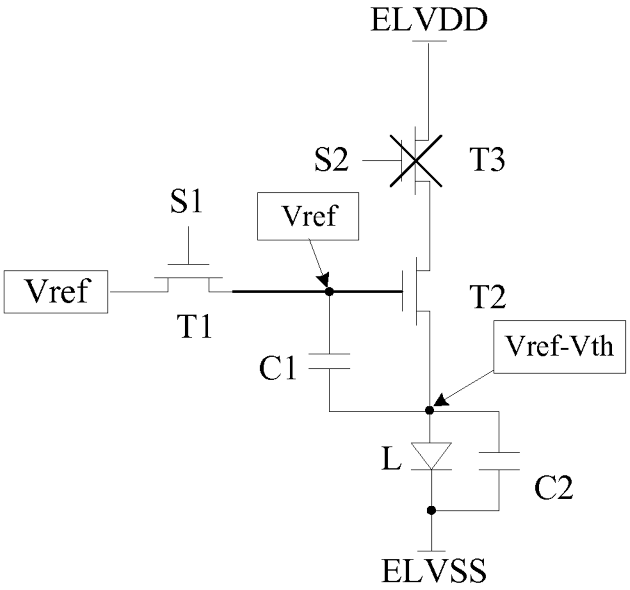
FIG. 5 is a schematic diagram of an equivalent circuit of a pixel circuit provided in an embodiment of the present disclosure before being ready to write data.
Figure 6:
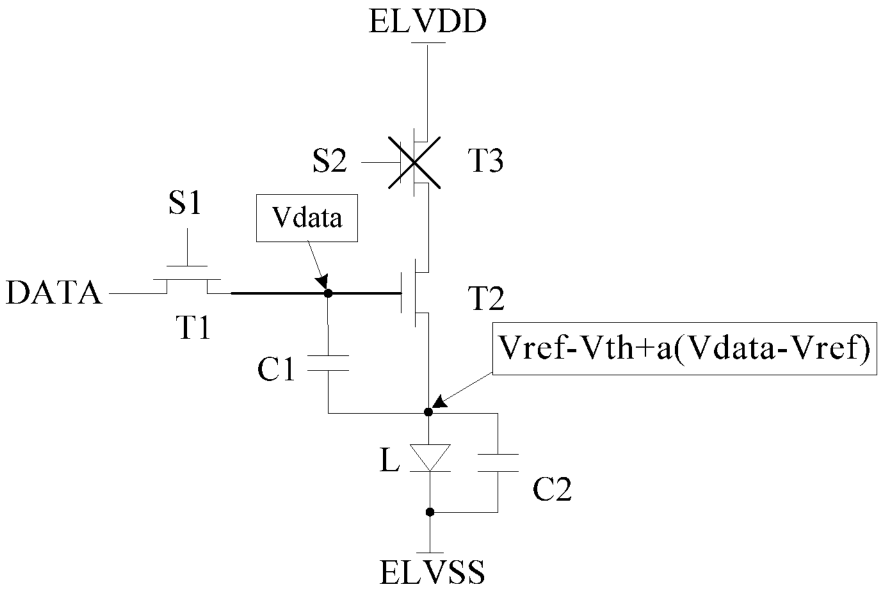
FIG. 6 is a schematic diagram of an equivalent circuit of a pixel circuit provided in an embodiment of the present disclosure in a data writing phase.

The phase P3 is the data writing phase. It is required to turn off the third transistor T3 before the pixel circuit is ready to write data. The equivalent circuit in this phase is as shown in FIG. 5. The gate voltage of the second transistor T2 is the reset signal Vref at the low level input by the data signal terminal DATA. Now, the anode voltage of the light emitting device L is Vref−Vth. In the data writing phase, the equivalent circuit is as shown in FIG. 6, wherein the first control signal terminal S1 and the first power supply signal terminal ELVDD are input the high level, the second control signal terminal S2 is input the low level, and the data signal terminal DATA is input the data signal (Vdata) at the high level. Now, the first transistor T1 and the second transistor T2 are turned on, and the third transistor T3 is turned off. Then, due to the voltage dividing effect of the parasitic capacitor C2 formed by the storage voltage C1 and the light emitting device, the anode voltage of the light emitting device L changes now into Vref−Vth+a(Vdata−Vref), where $a=C_{ST}/(C_{ST}+C_L+C_L)$, and $C_L$ is capacitance of the parasitic capacitor C2.

Figure 7:
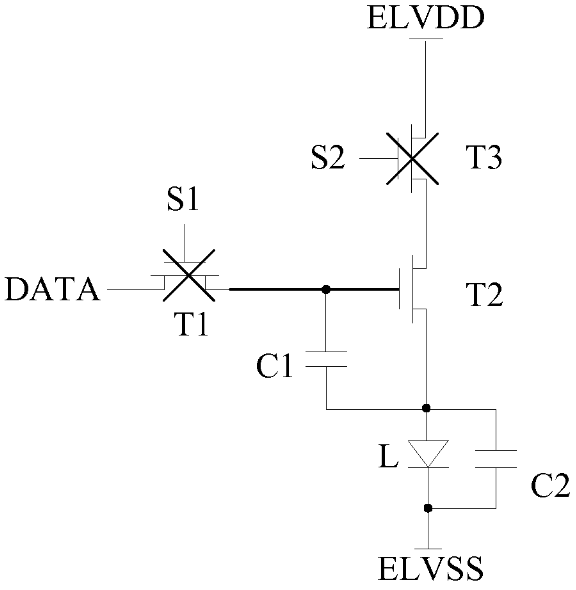
FIG. 7 is a schematic diagram of an equivalent circuit of a pixel circuit provided in an embodiment of the present disclosure before being ready to drive a light emitting device to emit light.
Figure 8:
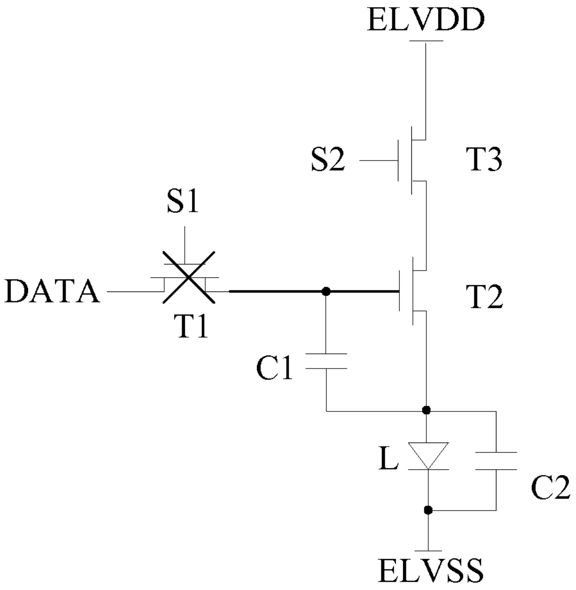
FIG. 8 is a schematic diagram of an equivalent circuit of a pixel circuit provided in an embodiment of the present disclosure in a light emitting phase.

The P4 phase is the light emitting phase. It is required to turn off the first transistor T1 before the pixel circuit is ready to drive the light emitting device to emit light. The equivalent circuit in this phase is as shown in FIG. 7. In the light emitting phase, the first power supply signal terminal ELVDD and the second control signal terminal S2 are input the high level, and the first control signal terminal S1 is input the low level, so that the third transistor T3 is turned on and the first transistor T1 is maintained to be turned off. Now, the equivalent circuit is as shown in FIG. 8. At this time, the voltage difference between the gate and source of the second transistor T2 is Vgs=(1−a)Vdata−Vref)+Vth.

Now, the current flowing through the third transistor T3, the second transistor T2 and the light emitting device L is:

$$I_{OLED}=\frac{1}{2}\mu_n\cdot Cox\cdot\frac{W}{L}\cdot(Vgs-Vth)^2,$$

then $$I_{OLED}=\frac{1}{2}\mu_n\cdot Cox\cdot\frac{W}{L}\cdot[(1-a)(Vdata-Vref)]^2$$

It can be known from the above equation that the current for driving the light emitting device L to emit light is unrelated to the threshold voltage of TFT and the voltage at the two terminals of OLED, thereby eliminating effectively the influence of non-uniformity and drift of the threshold voltage.

It needs to note that in the above embodiments, the transistors is described by taking the enhancement N type TFTs as an example. Or, depletion N type TFTs can also be adopted. The different lies in the threshold voltage Vth for the enhancement type TFTs is a positive value, while the threshold voltage Vth for the depletion type TFTs is a negative value.

The pixel circuit with such a structure, regardless of the enhancement type TFTs or the depletion type TFTs, can compensate for the influence of non-uniformity of the threshold voltage, and thus has wider applicability. At the same time, this structure uses a smaller number of TFTs, has a simple control signal, and is applicable to a high-resolution pixel design.

An embodiment of the present disclosure further provides a display apparatus comprising an organic light emitting display and other displays and the like. The display apparatus comprises any one of the pixel circuits as described above. The display apparatus can comprise a plurality of pixel unit arrays. Each pixel unit comprises any one of the pixel circuits as described above.

As an example, the display apparatus provided in the embodiment of the present disclosure can be a display apparatus having a current-driven light emitting device and including the LED Display or OLED display.

The display apparatus provided in the embodiment of the present disclosure comprises the pixel circuit and controls turning off/on and charging/discharging of the circuit through a plurality of transistors and capacitors, so that the current flowing through the transistors and being used to drive the light emitting device is unrelated to the threshold voltage of the transistors, which compensates for the difference in current flowing through the light emitting device due to inconsistency or offset of the threshold voltage of the transistors, raises uniformity of light emitting brightness of the display apparatus, and greatly enhances display effect. In addition, since this pixel circuit has a simple structure and a smaller number of transistors, the size of shading area covering the transistors can be reduced and the aperture ratio of the display apparatus is increased effectively.

Figure 9:
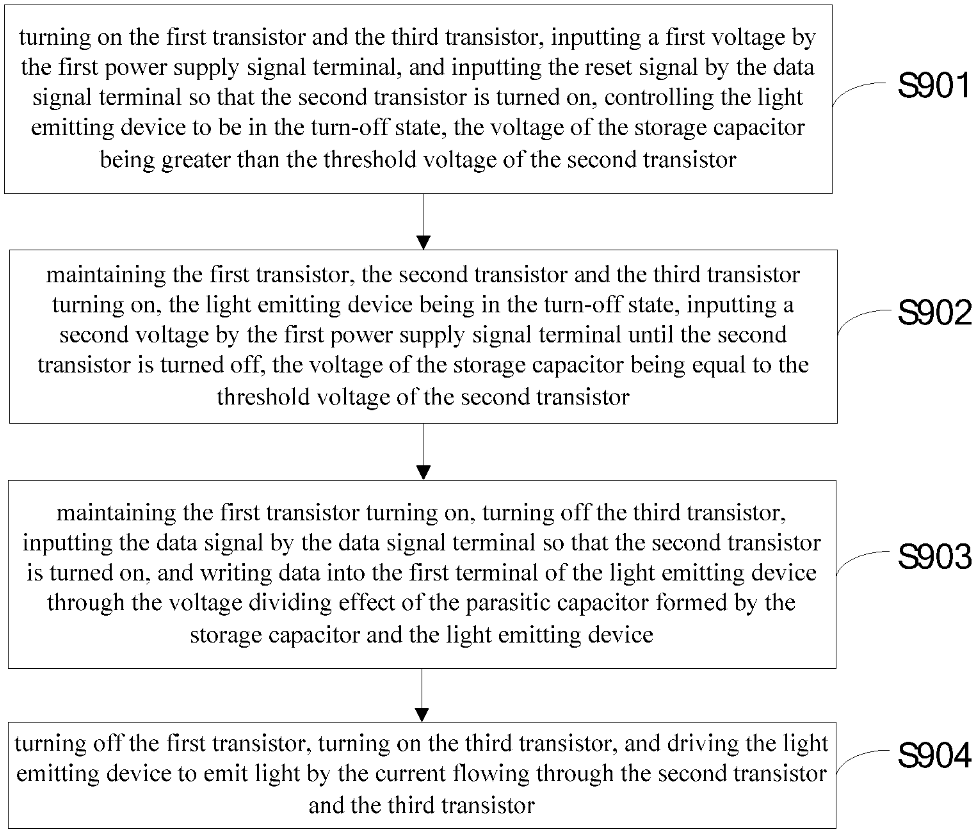
FIG. 9 is flow schematic diagram of a pixel circuit driving method provided in an embodiment of the present disclosure.

FIG. 9 shows schematically a flow of a pixel circuit driving method of an embodiment of the present disclosure. The pixel circuit driving method provided in an embodiment of the present disclosure can be applicable to the pixel circuits provided in the embodiments described above. As shown in FIG. 9, the method comprises following operating processes.

In step S901, the first transistor and the third transistor are turned on, the first power supply signal terminal is input a first voltage, and the data signal terminal is input the reset signal, so that the second transistor is turned on, the light emitting device is controlled to be in the turn-off state, and the voltage of the storage capacitor is greater than the threshold voltage of the second transistor.

In step S902, the first transistor, the second transistor and the third transistor are maintained turning on, the light emitting device is in the turn-off state, and the first power supply signal terminal is input a second voltage until the second transistor is turned off, and the voltage of the storage capacitor is equal to the threshold voltage of the second transistor.

In step S903, the first transistor is maintained turning on, the third transistor is turned off, and the data signal terminal is input the data signal, so that the second transistor is turned on, and data is written into the first terminal of the light emitting device through the voltage dividing effect of the storage capacitor and the parasitic capacitor formed by the light emitting device.

In step S904, the first transistor is turned off, the third transistor is turned on, and the current flowing through the second transistor and the third transistor drives the light emitting current to emit light.

The pixel circuit driving method provided in the embodiment of the present disclosure controls turning off/on and charging/discharging of the circuit through a plurality of transistors and capacitors, so that the current flowing through the transistors and being used to drive the light emitting device is unrelated to the threshold voltage of the transistors, which compensates for the difference in current flowing through the light emitting device due to inconsistency or offset of the threshold voltage of the transistors, raises uniformity of light emitting brightness of the display apparatus, and greatly enhances display effect. In addition, since this pixel circuit has a simple structure and a smaller number of transistors, the size of shading area covering the transistors can be reduced and the aperture ratio of the display apparatus is increased effectively.

It needs to note that the light emitting device in the embodiments of the present disclosure can be various current-driven light emitting devices including LED or OLED.

In the embodiments of the present disclosure, the first transistor, the second transistor and the third transistor are N type transistors. The timing of the control signal can be as shown in FIG. 2, and then the control timing corresponding to the step S901 is: the first control signal terminal and the second control signal terminal are input the high level, the first power supply signal terminal is input the low level, and the data signal terminal is input the reset signal at the low level.

The control timing corresponding to the step S902 is: the first control signal terminal, the second control signal terminal and the first power supply signal terminal are input the high level, and the data signal terminal is input the reset signal at the low level.

The control timing corresponding to the step S903 is: the first control signal terminal and the first power supply signal terminal are input the high level, the second control signal terminal is input the low level, and the data signal terminal is input the data signal at the high level.

The control timing corresponding to the step S904 is: the first power supply signal terminal and the second control signal terminal are input the high level, and the first control signal terminal and the data signal terminal are input the low level.

As an example, when the first transistor, the second transistor and the third transistor are N type transistors, the step S901 can comprise: the first control signal terminal S1 and the second control signal terminal S2 are input the high level, the first power supply signal terminal ELVDD is input the low level (Voted), and the data signal terminal DATA is input the reset signal (Vref) at the low level, wherein Vref−Voled>Vth (Vth is the threshold voltage of the second transistor T2).

The step S901 is corresponding to the resetting phase. As shown in FIG. 2, in the resetting phase (P1), the first control signal terminal S1 and the second control signal terminal S2 are input the high level, the first power supply signal terminal ELVDD is input the low level (Voted), and the data signal terminal DATA is input the reset signal (Vref) at the low level. Now, the first transistor T1, the second transistor T2 and the third transistor T3 are turned on, the voltage across the storage capacitor C1 is Vref−Voled, the anode voltage of the light emitting device L is Voted, and the light emitting device L is in the turn-off state.

Correspondingly, the step S902 can comprise: the first control signal terminal S1, the second control signal terminal S2 and the first power supply signal terminal ELVDD are input the high level, and the data signal terminal DATA is input the reset signal (Vref) at the low level.

The step S902 is corresponding to the compensating phase. In this phase, the first transistor T1, the second transistor T2 and the third transistor T3 are maintained turning on, and the anode voltage of the light emitting device L rises as the second transistor T2 is charged until the voltage is equal to Vref−Vth. When the compensating phase ends up, the second transistor is turned off, the voltage across the storage capacitor is the threshold voltage Vth of the second transistor, and charges stored at the two terminals of the storage capacitor C1 is Vth·$C_{ST}$, where $C_{ST}$ is the capacitance of the storage capacitor C1.

Thereafter, the step S903 can comprise: it is required to turn off the third transistor T3 before the pixel circuit is ready to write data. The equivalent circuit at this time is as shown in FIG. 5. The gate voltage of the second transistor T2 is the reset signal Vref at the low level input by the data signal terminal DATA. Now, the anode voltage of the light emitting device L is Vref−Vth.

The step S903 is corresponding to the data writing phase. In this phase, the first control signal terminal S1 and the first power supply signal terminal ELVDD are input the high level, the second control signal terminal S2 is input the low level, and the data signal terminal DATA is input the data signal (Vdata) at the high level. Since the first transistor T1 and the second transistor T2 are turned on at this time, the gate voltage of the second transistor increases from Vref to Vdata, and the potential at the gate of the second transistor T2 changes by Vdata−Vref. Further, due to the voltage dividing effect of the storage capacitor and the parasitic capacitor formed by the light emitting device, the voltage across the storage capacitor C1 changes by $C_L(C_{ST}+C_L)$(Vdata−Vref), $C_L$ is the capacitance of the parasitic capacitor Cs formed by the light emitting device. The voltage across the parasitic capacitor Cs formed by the light emitting device changes by $C_{ST}/(C_{ST}+C_L)$(Vdata−Vref), that is, the anode voltage of the light emitting device L changes by a(Vdata−Vref), where a=$C_{ST}/(C_{ST}+C_L)$. Then, the anode voltage of the light emitting device L changes into Vref−Vth+a(Vdata−Vref) now, and thus data writing is completed. However, since the third transistor T3 is turned off, the light emitting device is maintained turning off.

In addition, the step S904 can comprise: it is required to turn off the first transistor T1 before the pixel circuit is ready to drive the light emitting device to emit light.

The step S904 is corresponding to the light emitting phase. In this phase, the first power supply signal terminal ELVDD and the second control signal terminal S2 are input the high level, and the first control signal terminal S1 is input the low level, so that the third transistor T3 is turned on, and the first transistor T1 is maintained turning off. Now, the gate voltage of the second transistor T2 is Vdata, and the source voltage thereof is Vref−Vth+a(Vdata−Vref), then the voltage difference Vgs between the gate and source of the second transistor T2 is: Vgs=Vdata−[Vref−Vth+a(Vdata−Vref)], then Vgs=(1−a)(Vdata−Vref)+Vth.

Now, the current flowing through the third transistor T3, the second transistor T2 and the light emitting device L is:

$$I_{OLED} = \frac{1}{2}\mu_n \cdot Cox \cdot \frac{W}{L} \cdot (Vgs - Vth)^2,$$

then $$I_{OLED} = \frac{1}{2}\mu_n \cdot Cox \cdot \frac{W}{L} \cdot [(1-a)(Vdata - Vref)]^2.$$

It can be known from the above equation that the current for driving the light emitting device L to emit light is unrelated to the threshold voltage of TFT and the voltage at the two terminals of OLED, thereby eliminating effectively the influence of non-uniformity and drift of the threshold voltage.

The pixel circuit with such a structure, regardless of the enhancement type TFTs or the depletion type TFTs, can compensate for the influence of non-uniformity of the threshold voltage, and thus has wider applicability. At the same time, this structure uses a smaller number of TFTs, has a simple control signal, and is applicable to a high-resolution pixel design.

Those skilled in the art can understand: all or part of flows that realize the above method embodiments can be completed by computer program instruction related hardwares. The above program can be stored in a computer readable storage medium. Upon being executing, the program executes the steps comprising the above method embodiments. The above storage medium comprises various media that can store program codes such as ROM, RAM, disk or optical disk and the like.

The above descriptions are just exemplary embodiments of the present disclosure, but the protection scope of the present disclosure is not limited thereto. Any alternation or replacement that can be easily conceived by those skilled in the art within the technical scope of the present disclosure shall fall into the protection scope of the present disclosure. Therefore, the protection scope of the present disclosure shall be subject to the protection scope of the claims.

The present application claims the priority of a Chinese patent application No. 201410126737.8 filed on Mar. 31, 2014. Herein, the content disclosed by the Chinese patent application is incorporated in full by reference as a part of the present disclosure.

What is claimed is:

1. A pixel circuit, comprising:

only a first transistor, a second transistor, a third transistor, a storage capacitor and a light emitting device;

a gate of the first transistor is connected to a first control signal terminal, and a first electrode thereof is directly connected to a data signal terminal;

a gate of the second transistor is connected to a second electrode of the first transistor, a first electrode thereof is connected to a second electrode of the third transistor, and a second electrode thereof is connected to a first terminal of the light emitting device;

a gate of the third transistor is connected to a second control signal terminal, and a first electrode thereof is connected to a first power supply signal terminal;

one terminal of the storage capacitor is connected to the gate of the second transistor, and the other terminal thereof is connected to the second electrode of the second transistor;

one terminal of a parasitic capacitor formed by the light emitting device is connected to the first terminal of the light emitting device, and the other terminal thereof is connected to a second terminal of the light emitting device; and the second terminal of the light emitting device is further connected to a second power supply signal terminal.

2. The pixel circuit according to claim 1, wherein the first transistor, the second transistor and the third transistor are N type transistors;

first electrodes of the first transistor, the second transistor and the third transistor are drains, second electrodes thereof are sources, the first terminal of the light emitting device is an anode of the light emitting device, and the second terminal thereof is a cathode of the light emitting device.

3. The pixel circuit according to claim 1, wherein the transistors comprise depletion type TFTs or enhancement type TFTs.

4. The pixel circuit according to claim 1, wherein the light emitting device is an organic light emitting diode.

5. A display apparatus, comprising the pixel circuit according to claim 1.

6. A pixel circuit driving method for driving a pixel circuit which comprises only a first transistor, a second transistor, a third transistor, a storage capacitor and a light emitting device, comprising following steps:

in a first phase, turning on the first transistor and the third transistor; inputting a first voltage by a first power supply signal terminal, inputting a reset signal by a data signal terminal, turning on the second transistor, and controlling the light emitting device to be in a turn-off state, such that a voltage of the storage capacitor is greater than a threshold voltage of the second transistor;

in a second phase, maintaining the first transistor and the third transistor turning on; making the light emitting device be in the turn-off state, inputting a second voltage by the first power supply signal terminal until the second transistor is turned off, and making the voltage of the storage capacitor equal to the threshold voltage of the second transistor;

in a third phase, maintaining the first transistor turning on; turning off the third transistor, inputting a data signal by the data signal terminal, so that the second transistor is turned on, and data is written into the first terminal of the light emitting device through an voltage dividing effect of the storage capacitor and a parasitic capacitor formed by the light emitting device; and in a fourth phase, turning off the first transistor, turning on the third transistor, and driving the light emitting device to emit light by a current flowing through the second transistor and the third transistor.

7. The pixel circuit driving method according to claim 6, wherein it further comprises in the first phase: inputting a high level at the first control signal terminal and the second control signal terminal, inputting a low level at the first power supply signal terminal, and inputting the reset signal of the low level at the data signal terminal;

it further comprises in the second phase: inputting the high level at the first control signal terminal, the second control signal terminal and the first power supply signal terminal, and inputting the reset signal of the low level at the data signal terminal is;

it further comprises in the third phase: inputting the high level at the first control signal terminal and the first power supply signal terminal, inputting the low level at the second control signal terminal, and inputting the data signal of the high level at the data signal terminal;

it further comprises in the fourth phase: inputting the high level at the first power supply signal terminal and the second control signal terminal, and inputting the low level at the first control signal terminal and the data signal terminal.

8. The pixel circuit driving method according to claim 6, wherein the first transistor, the second transistor and the third transistor ate N type transistors.

9. The pixel circuit driving method according to claim 6, wherein the transistors comprise depletion type TFTs or enhancement type TFTs.

10. The pixel circuit driving method according to claim 6, wherein the light emitting device is an organic light emitting diode.

11. The display apparatus according to claim 5, wherein the first transistor, the second transistor and the third transistor are N type transistors;

first electrodes of the first transistor, the second transistor and the third transistor are drains, second electrodes thereof are sources, the first terminal of the light emitting device is an anode of the light emitting device, and the second terminal thereof is a cathode of the light emitting device.

12. The display apparatus according to claim 5, wherein the transistors comprise depletion type TFTs or enhancement type TFTs.

13. The display apparatus according to claim 5, wherein the light emitting device is an organic light emitting diode.

* * * * *